US007646162B2

(12) United States Patent
Ma

(10) Patent No.: US 7,646,162 B2

(45) Date of Patent: Jan. 12, 2010

(54) CONTROL CIRCUIT FOR FAN OPERATING

(75) Inventor: Ching-Cheng Ma, Pingtung County (TW)

(73) Assignee: ADDA Corporation, Pingtung (TW)

(*) Notice: Subject to any disclaimer, the term of this patent is extended or adjusted under 35 U.S.C. 154(b) by 139 days.

(21) Appl. No.: 11/882,623

(22) Filed: Aug. 3, 2007

(65) Prior Publication Data

US 2009/0034943 A1 Feb. 5, 2009

(51) Int. Cl.
*G05B 11/28* (2006.01)

(52) U.S. Cl. ................... 318/599; 318/811; 388/907.51

(58) Field of Classification Search ................. 318/471, 318/599, 811; 388/800, 809, 815, 907.5
See application file for complete search history.

(56) References Cited

U.S. PATENT DOCUMENTS 5,197,858 A * 3/1993 Cheng ......................... 417/14
6,091,887 A * 7/2000 Dieterle et al. .............. 388/811
6,310,453 B1 * 10/2001 Lin ............................ 318/445
6,943,517 B2 * 9/2005 Yoshitomi et al. ........... 318/471
2005/0047762 A1 * 3/2005 Liu et al. .................... 388/806

* cited by examiner

*Primary Examiner*—Rina I Duda
(74) *Attorney, Agent, or Firm*—Muncy, Geissler, Olds & Lowe, PLLC

(57) ABSTRACT

A control circuit for fan operating comprises a drive operating circuit, a potential modulating circuit, a comparator and a switch circuit. The drive operating circuit at least has a voltage source, a drive IC, a Hall IC and a motor coil winding, the drive IC is connected with the voltage source, and the Hall IC and the motor coil winding are connected with the drive IC. The potential modulating circuit is connected with the drive IC of the drive operating circuit and has a modulating signal source to provide a PWM signal with a duty cycle. The comparator has an input end and an output end, the input end is connected with the potential modulating circuit, and potential state of the output end is determined in accordance with the duty cycle of the PWM signal. The switch circuit is connected with the drive IC of the drive operating circuit and the output end of the comparator, and operating state of the drive IC of the drive operating circuit is determined in accordance with potential state of the output end.

8 Claims, 1 Drawing Sheet

10 12 11 13 VCC R3 R5 R9 VTH CT 31a 31 C2 PWM R7 b c e Q1 R2 R1 R8 Q2 40 21 R4 C1 R6 31b 30 32 W T R=W/T 20 22 23

CONTROL CIRCUIT FOR FAN OPERATING

FIELD OF THE INVENTION

The present invention is relating to a control circuit for fan operating, particularly to a control circuit for fan operating, which controls fan in start region with duty cycle of a PWM (Pulse Width Modulation) signal.

BACKGROUND OF THE INVENTION

In general, it is necessary to regulate or control fan in start region for practical application in some cases, however, the known control circuit for fan operating almost provides only start or stop function under an appointed region unable to control fan for satisfying applied requirements in start region.

SUMMARY OF THE INVENTION

The primary object of the present invention is to provide a control circuit for fan operating, which controls potential state (High or Low) of output end of a comparator with duty cycle of a PWM signal. Then a switch circuit determines operating state of a drive IC in accordance with potential state of the output end of the comparator to control fan operating in start region.

A control circuit for fan operating in accordance with the present invention comprises a drive operating circuit, a potential modulating circuit, a comparator and a switch circuit. The drive operating circuit at least has a voltage source, a drive IC, a Hall IC and a motor coil winding, in which the drive IC is connected with the voltage source, the Hall IC and the motor coil winding are connected with the drive IC. The potential modulating circuit connected with the drive IC of the drive operating circuit has a modulating signal source for providing a PWM signal with duty cycle. The comparator has an input end and an output end, in which the input end is connected with the potential modulating circuit, the potential state of the output end is determined in accordance with the duty cycle of the PWM signal. The switch circuit is connected with the drive IC of the drive operating circuit and the output end of the comparator. The operating state of the drive IC of the drive operating circuit is determined in accordance with potential state of the output end.

DETAILED DESCRIPTION OF THE INVENTION

Figure 1:
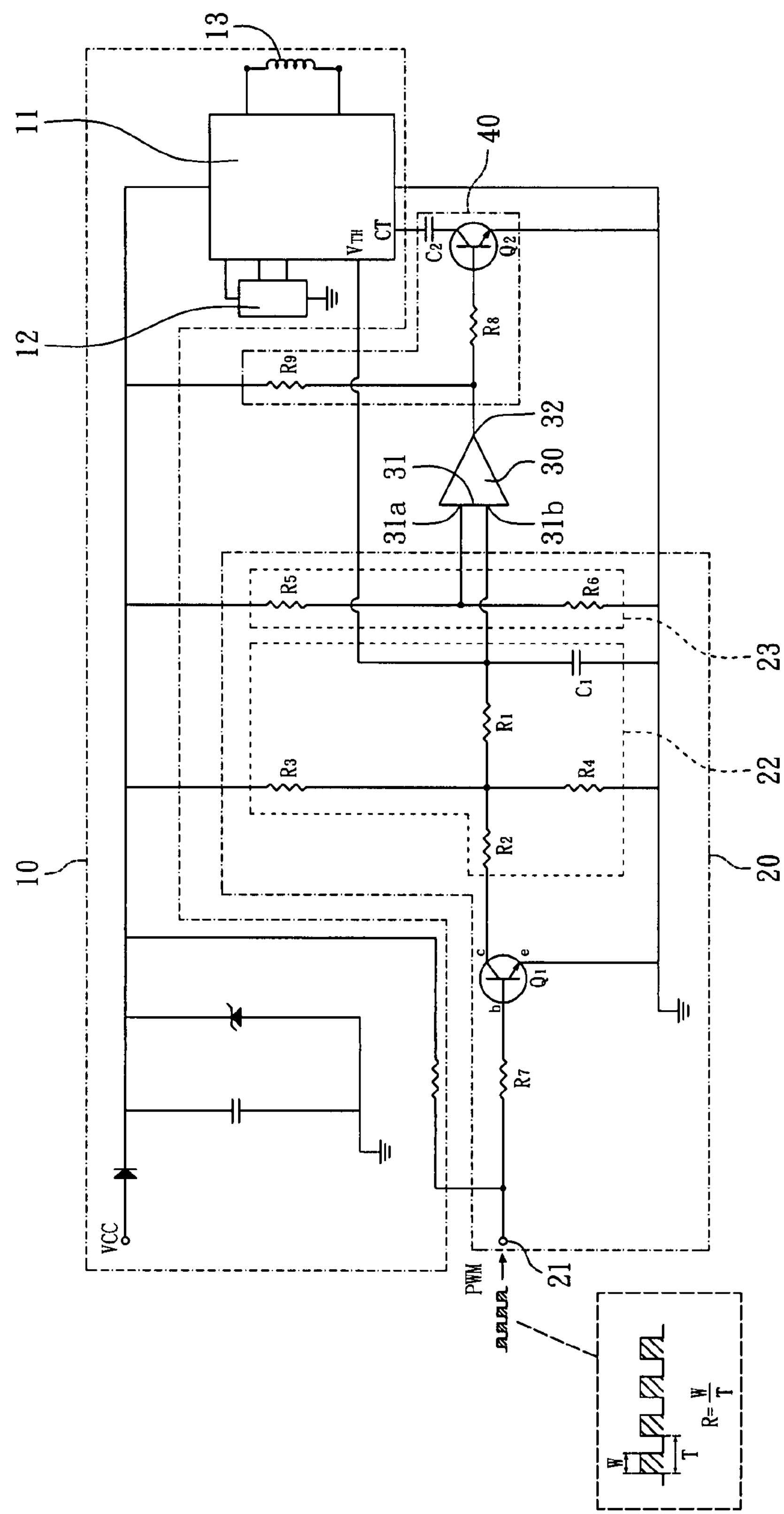
FIG. 1 shows a control circuit for fan operating in accordance with a preferred embodiment of the present invention.

A control circuit for fan operating with reference to FIG. 1 in accordance with a preferred embodiment of the present invention comprises a drive operating circuit 10, a potential modulating circuit 20, a comparator 30 and a switch circuit 40. The drive operating circuit 10 at least has a voltage source VCC, a drive IC 11, a Hall IC 12 and a motor coil winding 13, wherein the drive IC 11, is connected with the voltage source VCC, has a level control pin $V_{TH}$ and a capacitive switch pin CT, the Hall IC 12 and the motor coil winding 13 are connected with the drive IC 11. In this embodiment, the Hall IC 12 is utilized for driving the motor coil winding 13 and controlling fan in running or stopping state.

The potential modulating circuit 20 connected with the drive IC 11 of the drive operating circuit 10 has a modulating signal source 21, a first transistor Q1, a voltage-dividing unit 22 and a reference unit 23. The modulating signal source 21 provides a PWM (Pulse Width Modulation) signal with a duty cycle R. The duty cycle R is typically calculated through the proportion (W/T) of the pulse width W and the pulse cycle T adjustable in range of 0-100%. The first transistor Q1 is connected with the modulating signal source 21 and the voltage-dividing unit 22. In this embodiment, the first transistor Q1 has a base b connected with the modulating signal source 21, a collector c connected with the voltage-dividing unit 22 and an emitter e grounded. The voltage-dividing unit 22 is connected with the level control pin $V_{TH}$ of the drive IC 11.

The comparator 30 has an input end 31 having a positive input node 31*a* and a negative input node 31*b* and an output end 32. In this embodiment, the positive input node 31*a* is connected with the reference unit 23 of the potential modulating circuit 20 for serving as reference potential of the input end 31 of the comparator 30, the negative input node 31*b* is connected with the voltage-dividing unit 22 of the potential modulating circuit 20, and the duty cycle R of the PWM signal controls voltage variation of the negative input node 31*b* via the first transistor Q1 and the voltage-dividing unit 22. The comparator 30 compares reference potential of the positive input node 31*a* with voltage of the negative input node 31*b* prior to determining potential state (High or Low) of the output end 32. Preferably, the voltage-dividing unit 22 has a first resistor R1, a second resistor R2, a third resistor R3, a fourth resistor R4 and a first capacitor C1, in which the first resistor R1 and the first capacitor C1 are connected with the negative input node 31*b* of the input end 31 of the comparator 30, both ends of the second resistor R2 are connected with the first resistor R1 and the first transistor Q1 respectively, the third resistor R3 and the fourth resistor R4 are connected with the first resistor R1. Besides, the reference unit 23 has a fifth resistor R5 and a sixth resistor R6 and both of them are connected with the positive input node 31*a* of the input end 31 of the comparator 30. The potential modulating circuit 20 further has a seventh resistor R7 and both ends of the seventh resistor R7 are connected with the modulating signal source 21 and the first transistor Q1 respectively.

The switch circuit 40 is connected with the drive IC 11 of the drive operating circuit 10 and the output end 32 of the comparator 30, and operating state of the drive IC 11 of the drive operating circuit 10 is determined in accordance with potential state (High or Low) of the output end 32. In this embodiment, the switch circuit 40 has a eighth resistor R8, a ninth resistor R9, a second transistor Q2 and a second capacitor C2, in which the eighth resistor R8 is connected with the output end 32 of the comparator 30 and the ninth resistor R9, two ends of the second transistor Q2 are connected with the eighth resistor R8 and the second capacitor C2 respectively and the other end is grounded, the second capacitor C2 is connected with the capacitive switch pin CT of the drive IC 11. In this embodiment, the drive IC 11 may have an auto restart function by means of adding the second capacitor C2.

Next, detailed operating method about the control circuit for fan operating will be described as follows.

When the PWM signal of the modulating signal source 21 is input, it passes through the first transistor Q1 and the voltage-dividing unit 22 and then an appropriate DC (Direct Current) level can be obtained, which the higher the duty cycle R of the PWM signal is, the lower the DC level of the level control pin $V_{TH}$ connected with the drive IC 11 correspondingly is. On the contrary, the lower the duty cycle R is, the higher the DC level correspondingly is. In this embodiment, when the duty cycle R of the PWM signal is relatively lower, potential state of the output end 32 of the comparator 30 will show “Low” state and in the meantime the second transistor Q2 of the switch circuit 40 shows "OFF" state enabling the drive IC 11 not to operate, so fan is in stop motion. On the contrary, when the duty cycle R of the PWM signal is relatively higher, potential state of the output end 32 of the comparator 30 will show "High" state and in the meantime the second transistor Q2 of the switch circuit 40 shows "ON" state enabling the drive IC 11 to normally operate, so fan is in running motion. In this invention, the duty cycle R of the PWM signal may be determined in accordance with requirements from outside environment to regulate potential state of the output end 32 of the comparator 30 at which the switch circuit 40 is able to determine operating state of the drive IC 11 of the drive operating circuit 10 in accordance with potential state (High or Low) of the output end 32, thereby controlling fan in start region.

While the present invention has been particularly illustrated and described in detail with respect to the preferred embodiments thereof, it will be clearly understood by those skilled in the art that various changed in form and details may be made without departing from the spirit and scope of the present invention.

What is claimed is:

1. A control circuit for fan operating comprising:

a drive operating circuit at least having a voltage source, a drive IC, a Hall IC and a motor coil winding, wherein the drive IC is connected with the voltage source, the Hall IC and the motor coil winding are connected with the drive IC;

a potential modulating circuit connected with the drive IC of the drive operating circuit having a modulating signal source, the modulating signal source providing a PWM signal with a duty cycle;

a comparator having an input end and an output end, wherein the input end is connected with the potential modulating circuit, potential state of the output end is determined in accordance with the duty cycle of the PWM signal; and a switch circuit connected with the drive IC of the drive operating circuit and the output end of the comparator, wherein operating state of the drive IC of the drive operating circuit is determined in accordance with potential state of the output end;

wherein the potential modulating circuit further has a first transistor, a voltage-dividing unit and a reference unit, the first transistor is connected with the modulating signal source and the voltage-dividing unit, the voltage-dividing unit and the reference unit are connected with the input end of the comparator; and wherein the drive IC has a level control pin connected with the voltage-dividing unit of the potential modulating circuit and a capacitance switch pin connected with the switch circuit.

2. The control circuit for fan operating in accordance with claim 1, wherein the input end of the comparator has a positive input node and a negative input node, the reference unit is connected with the positive input node of the input end, and the voltage-dividing unit is connected with the negative input node of the input end.

3. The control circuit for fan operating in accordance with claim 2, wherein the voltage-dividing unit has a first resistor, a second resistor, a third resistor, a fourth resistor and a first capacitor, the first resistor and the first capacitor are connected with the negative input node of the input end, and the second resistor, the third resistor and the fourth resistor are connected with the first resistor.

4. The control circuit for fan operating in accordance with claim 3, wherein the reference unit has a fifth resistor and a sixth resistor and both the fifth resistor and the sixth resistor are connected with the positive input node of the input end.

5. The control circuit for fan operating in accordance with claim 4, wherein the potential modulating circuit further has a seventh resistor, two ends of the seventh resistor are connected with the modulating signal source and the first transistor respectively.

6. The control circuit for fan operating in accordance with claim 5, wherein the switch circuit has an eighth resistor, a ninth resistor, a second transistor and a second capacitor, the eighth resistor is connected with the output end of the comparator and the ninth resistor, and the second transistor is connected with the eighth resistor and the second capacitor.

7. The control circuit for fan operating in accordance with claim 6, wherein the drive IC has a capacitance switch pin, the second capacitor is connected with the capacitance switch pin of the drive IC.

8. The control circuit for fan operating in accordance with claim 6, wherein the second transistor is grounded.

* * * * *